United States Patent
Kaefer

(10) Patent No.: US 7,611,681 B2
(45) Date of Patent: Nov. 3, 2009

(54) PROCESS FOR THE REGENERATION OF A CATALYST PLANT AND APPARATUS FOR PERFORMING THE PROCESS

(75) Inventor: Gisbert Kaefer, Birmenstorf (CH)

(73) Assignee: Alstom Technology Ltd, Baden (CH)

( * ) Notice: Subject to any disclaimer, the term of this patent is extended or adjusted under 35 U.S.C. 154(b) by 1192 days.

(21) Appl. No.: 10/789,988

(22) Filed: Mar. 2, 2004

(65) Prior Publication Data

US 2004/0166034 A1 Aug. 26, 2004

Related U.S. Application Data

(62) Division of application No. 09/969,769, filed on Oct. 4, 2001, now Pat. No. 6,946,419.

(30) Foreign Application Priority Data

Oct. 4, 2000 (DE) .............................. 100 49 040

(51) Int. Cl.
*B01D 53/96* (2006.01)
*B01D 53/56* (2006.01)
*B01D 53/86* (2006.01)
*B01D 53/50* (2006.01)
*B01D 53/60* (2006.01)

(52) U.S. Cl. ...................... 422/178; 502/55; 502/34; 502/53

(58) Field of Classification Search ............... None
See application file for complete search history.

(56) References Cited

U.S. PATENT DOCUMENTS

| 4,533,365 A | 8/1985 | Ringel |
| 5,451,558 A | 9/1995 | Campbell et al. |
| 5,599,758 A | 2/1997 | Guth et al. |
| 5,607,650 A | 3/1997 | Debbage et al. |
| 5,665,321 A | 9/1997 | Campbell et al. |
| 5,762,885 A | 6/1998 | Debbage et al. |
| 5,953,911 A | 9/1999 | Guth et al. |
| 6,119,450 A * | 9/2000 | Boegner et al. ............... 60/274 |

FOREIGN PATENT DOCUMENTS

| DE | 196 28 796 C1 | 10/1997 |
| EP | 0 230 058 A1 | 7/1987 |
| JP | 07292372 A | 11/1995 |
| WO | WO 01/51178 A1 | 7/2001 |

\* cited by examiner

*Primary Examiner*—Melvin C Mayes
*Assistant Examiner*—James Corno
(74) *Attorney, Agent, or Firm*—Buchanan Ingersoll & Rooney PC

(57) ABSTRACT

A gas stream containing e.g. molecular hydrogen is used for the regeneration of a catalyst for NOx and SO2 removal from the flue gas of a gas turbine. In order to reduce the consumption of regeneration gas, the gas inlet is located between the SCOSOx catalyst (2) and the SCONOx catalyst (3). The regeneration gas leaves the catalyst chamber upstream of the SCOSOx catalyst and is recycled. For the regeneration of the SCONOx catalyst and to keep SO2 containing gas from entering the SCONOx catalyst, a second regeneration gas inlet is located downstream of the SCONOx catalyst. The regeneration gas entering the catalyst chamber through this port passes the SCONOx (3) and the SCOSOx catalyst (2). The direction of the flow in the SCONOx catalyst can also be reversed. In another example, regeneration gas outlets are located both upstream of the SCOSOx and downstream of the SCONOx catalyst. But, only the regeneration gas from the SCONOx catalyst is recycled.

22 Claims, 2 Drawing Sheets

US 7,611,681 B2

PROCESS FOR THE REGENERATION OF A CATALYST PLANT AND APPARATUS FOR PERFORMING THE PROCESS

This application is related to and claims priority under 35 U.S.C. § 119 to German Patent Application No. 100 49 040.9, filed Oct. 4, 2000, the entire contents of which are incorporated by reference herein. In addition, this application is a divisional of U.S. patent application Ser. No. 09/969,769 filed on Oct. 4, 2001, now U.S. Pat. No. 6,946,419, the entire contents of which are incorporated by reference herein.

FIELD OF THE INVENTION

The invention relates to a process for the regeneration of a catalyst plant for the removal of SO2 and NOx from the flue gas of a gas turbine, and also to an apparatus for carrying out the process.

BACKGROUND OF THE INVENTION

It has been known for a long time to reduce the SO2 content and the NOx content of the flue gases from gas turbines to environmentally acceptable values by means of catalyst plants which comprise respectively a so-called SCOSOx catalyst for the removal of SO2 and, downstream of this, a SCONOx catalyst for the removal of NOx. The catalysts are relatively rapid in their effect, and it is likewise known to regenerate them by means of substantially oxygen-free regenerating gas which is passed through them to restore their effectiveness.

Thus the use of a regenerating gas for the regeneration of a SCONOx catalyst is described in U.S. Pat. No. 5,762,885, and the gas contains 4% of molecular hydrogen as the active substance; the rest is a carrier gas, which principally consists of steam and contains small amounts of molecular nitrogen and carbon dioxide. If the regenerating gas is passed only once through the catalyst, a very high consumption results, and correspondingly high costs arise. In the described case, the production of the steam is costly in energy and correspondingly expensive, especially as demineralized water is required for its production. In the above reference, it is also proposed to utilize used regenerating gas as carrier gas. In a closed circuit of regenerating gas through a catalyst plant, which also contains a SCOSOx catalyst, the SO2 released in its regeneration would however poison the SCONOx catalyst.

SUMMARY OF THE INVENTION

The invention has as its object to provide a process of the category concerned, in which the consumption of regenerating gas is substantially reduced, without having to take account of the danger of a poisoning of the SCONOx catalyst by SO2. In one embodiment, the process extracts a regenerating gas from upstream of a SCOSOx catalyst or from between a SCOSOx catalyst and a SCONOx catalyst, introduces the extracted regenerating gas between the SCOSOx catalyst and the SCONOx catalyst or upstream of the SCOSOx catalyst, and introduces a fresh regenerating gas downstream of the SCONOx catalyst.

In an additional embodiment, the process extracts a regenerating gas from downstream of a SCONOx catalyst, introduces the extracted regenerating gas between a SCOSOx catalyst and the SCONOx catalyst, and extracts and removes the regenerating gas from upstream of the SCOSOx catalyst.

Furthermore, suitable apparatus is provided for carrying out the process. In one embodiment, an apparatus for regenerating catalyst in a catalyst plant comprises a catalyst plant, at least one supply pipe for the introduction of regenerating gas, at least one drain pipe for the extraction of regenerating gas, and a further supply pipe for the supply of fresh regenerating gas.

The invention provides a process of the category concerned, in which the regenerating gas is partially conducted in a closed circuit and hence is very well utilized, but transmission of the SO2 arising from the SCOSOx catalyst into the SCONOx catalyst is reliably prevented. The consumption of regenerating gas is substantially reduced, with a resulting cost savings in each case, but particularly when it consists of steam to a large extent.

BRIEF DESCRIPTION OF THE DRAWINGS

Preferred embodiments of the invention are disclosed in the following description and illustrated in the accompanying drawings, in which.

DETAILED DESCRIPTION OF THE INVENTION

Figure 1:
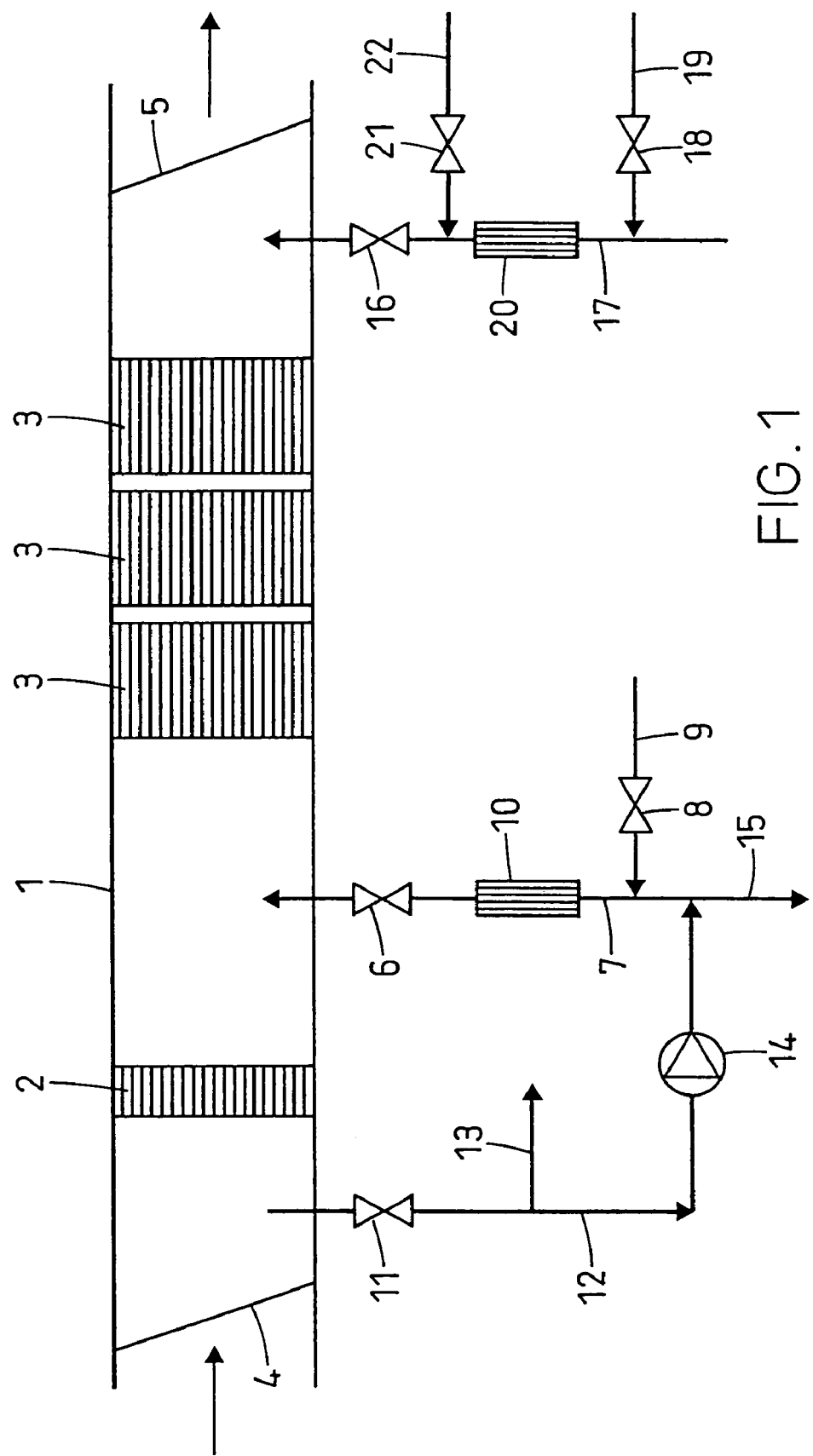
FIG. 1 shows schematically an apparatus according to the invention for carrying out the process according to the invention according to a first embodiment.

An apparatus according to the invention comprises (FIG. 1) a catalyst plant with a catalyst chamber 1, through which a portion of the flue gas of a gas turbine operated with natural gas, oil, synthesis gas or the like is conducted to a chimney, and in the latter, arranged in succession in the flow direction, a SCOSOx catalyst 2 for the removal of SO2 and a SCONOx catalyst 3 for the removal of NOx from the flue gas. By means of a first damper 4 arranged upstream and a second damper 5 arranged downstream, the SCOSOx catalyst 2 and the SCONOx catalyst 3 can be shut off from the flue gas stream.

A supply pipe 7 opens via an inlet valve 6 into the catalyst chamber 1 between the SCOSOx catalyst 2 and the SCONOx catalyst 3, and a supply pipe 9 opens into it via a feed valve 8. A steam reforming catalyst 10 is situated in the supply pipe 7 between the outlet of the supply pipe 9 and the feed valve 8. A drain pipe 12 leads via an outlet valve 11 from the catalyst chamber 1 between the first damper 4 and the SCOSOx catalyst 2, and from there branches a supply pipe 13 leading to a hydrogen monitor and an oxygen monitor. The drain pipe 12 is connected via a pump 14 to the supply pipe 7. A drain 15 branches off between the pump 14 and the outlet of the supply pipe 9 in the supply pipe 7.

A further supply pipe 17 opens via a supply valve 16 between the SCONOx catalyst 3 and the second damper 5, and a further supply pipe 19 opens into it. A steam reforming catalyst 20 is situated between the outlet of the supply pipe 19 and the feed valve 16, and a purge duct 22 opens via a purge valve 21.

When the catalyst plant is in operation, the dampers 4, 5 are open, and the valves 6, 11, 8 and 18 are closed. After about twenty minutes, the effect of the catalyst plant diminishes, and it has to be regenerated. For this purpose, the dampers 4, 5 are closed—the corresponding portion of the flue gas is meanwhile passed through other catalyst plants —and the outlet valve 11 and the feed valve 16 are opened. Furthermore, the purge valve 21 is opened, and a substantially oxygen-free cleaning gas, e.g., carrier gas, as described hereinafter, is supplied through the purge duct 22, driving the oxygen-containing flue gas out from the catalyst plant through the drain pipe 12, the pump 14, and the drain 15. The oxygen monitor connected via the supply pipe 13 indicates when the oxygen content has fallen so far that the purge process can be interrupted.

After closing the purge valve 21, a carrier gas such as steam, for example, is conducted into the catalyst plant via the supply pipe 17, and has natural gas mixed with it from the supply pipe 19 by opening the feed valve 18. On flowing through the regenerating catalyst 20, a portion of the hydrocarbons contained in the natural gas is converted into molecular hydrogen. On flowing through the SCONOx catalyst 3 and then the SCOSOx catalyst 2, these are regenerated, chiefly by the action of the hydrogen. Furthermore, the valves 6 and 8 are opened, thus making a connection to the pump 14, so that regenerat-ing gas drawn off via the drain pipe 12, and replaced as required by natural gas from the supply pipe 9 via the valve 8, and conducted back into the catalyst chamber 1 via the supply pipe 7. It then passes the steam reforming catalyst 10, where hydrocarbons are further converted into molecular hydrogen.

A flow is then maintained for as long as required, and includes a substantially closed circuit flow through the supply pipe 7, the SCOSOx catalyst 2 and the drain pipe 12, maintained by the pump 14. Onto this circuit flow there is superposed a linear flow, which leads from the supply pipe 17, through which fresh regenerating gas flows, through the SCONOx catalyst 3 and the SCOSOx catalyst 2, to the drain pipe 12. The last-named flow prevents regenerating gas which has already flowed through the SCOSOx catalyst 2 and therefore contains SO2, from reaching the SCONOx catalyst 3 out of the supply pipe 7. Respectively as much regenerating gas is drawn off through the drain 15 as is fed in through the supply pipe 17.

The supply of natural gas from the supply pipe 9 is regulated based on the measurement of the H2 content of the regenerating gas by means of the hydrogen monitor connected via the supply pipe 13. If the regeneration is shut off from the catalyst plant, the valves 6, 11, 16, and also 8, 18, are closed, and the dampers 4, 5 are opened again.

In this embodiment of the process according to the invention, the volume flow through the SCOSOx catalyst 2 corresponds to the sum of the volume flow through the SCONOx catalyst 3 and the volume flow of the returned regenerating gas. Since in the interest of as great as possible a savings of regenerating gas, the portion of the first should be as small as possible, this embodiment is particularly suitable when the regeneration requirement of the SCOSOx catalyst 2 considerably exceeds that of the SCONOx catalyst 3.

The arrangement consisting of the drain pipe 12, the pump 14 and the supply pipe 7 and also the parts and ducts connected thereto can also be arranged in a mirror-image manner, such that the drain pipe 12 opens between the SCOSOx catalyst 2 and the SCONOx catalyst 3, and the supply pipe 7 upstream of the SCOSOx catalyst 2. The flow direction in the portion of the catalyst containing the SCOSOx catalyst 2 would then be reversed, and the regenerating gas introduced through the supply pipe 17 would not flow directly through the SCOSOx catalyst 2, without the functioning of the apparatus being thereby substantially impaired.

Figure 2:
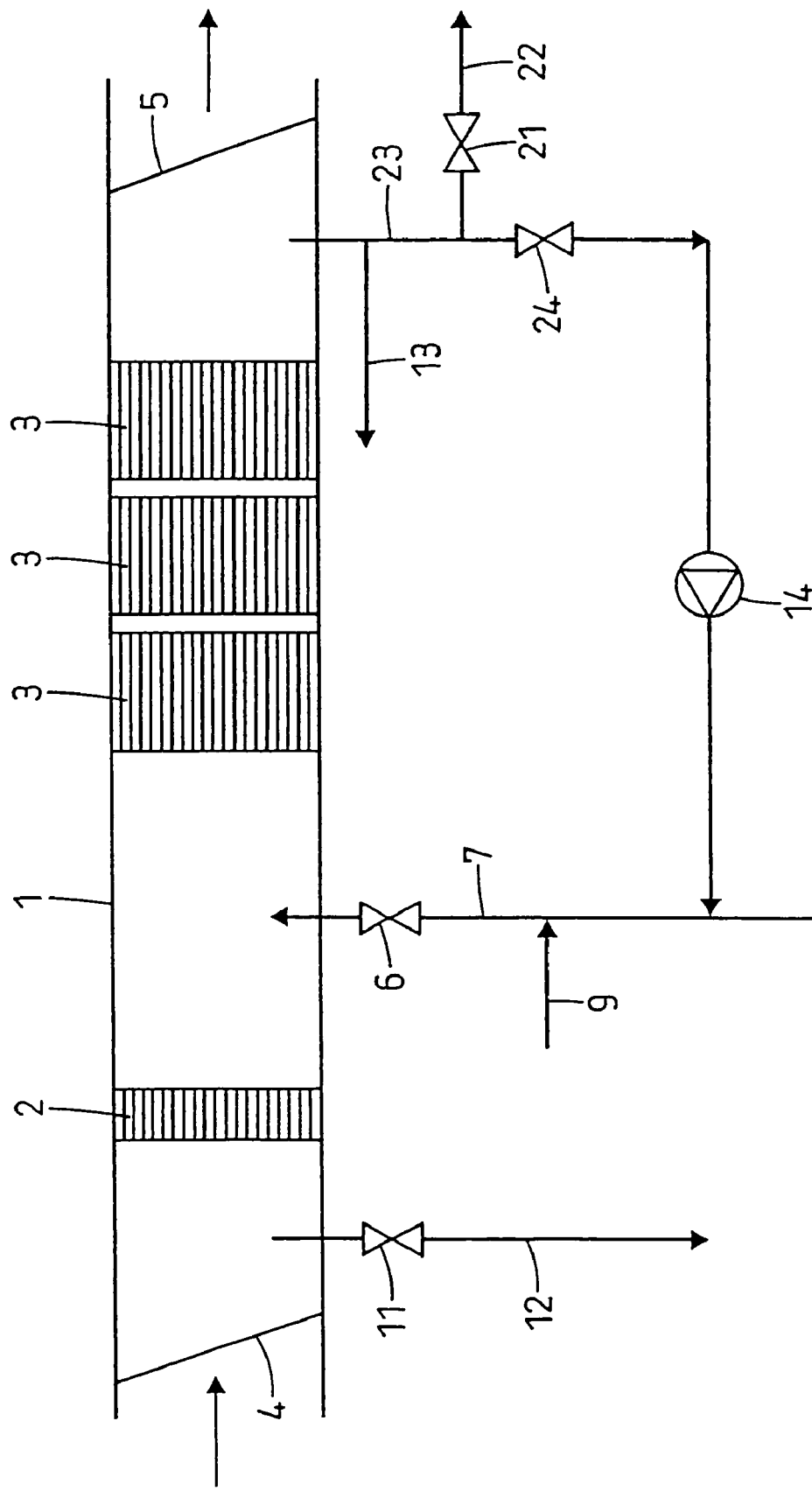
FIG. 2 shows schematically an apparatus according to the invention for carrying out the process according to the invention, according to a second embodiment.

A differing embodiment of the apparatus according to the invention is shown in FIG. 2. It is somewhat converted or simplified in a few additional points in contrast to the embodiment of FIG. 1, but can however be modified or supplemented to correspond to this embodiment, and vice versa. Corresponding parts have the same reference numerals in both Figures.

Here also, a catalyst plant includes a catalyst chamber 1, through which a portion of the flue gas of a gas turbine operated with natural gas is conducted to a chimney, and in the latter, arranged in succession in the flow direction, a SCOSOx catalyst 2 for removal of SO2 and a SCONOx catalyst 3, consisting of several sections, for the removal of NOx from the flue gas. The SCOSOx catalyst 2 and the SCONOx catalyst 3 can again be excluded from the flue gas stream by means of a first damper 4 arranged upstream and a second damper 5 arranged downstream.

Here also, a supply pipe 7, into which a further supply pipe 9 opens, opens into the catalyst chamber 1 between the SCOSOx catalyst 2 and the SCONOx catalyst 3. A drain pipe 12 leads out of the catalyst chamber 1 via an outlet valve between the first damper 4 and the SCOSOx catalyst 2. Furthermore, a drain pipe 23 leaves between the SCONOx catalyst 3 and the second damper, and leads via an outlet valve 24 and a pump 14 to the supply pipe 7, into which it opens outside the supply pipe 9. There branch off from the drain pipe 23, still within the outlet valve 24, a supply pipe 13, which leads to an oxygen monitor and a hydrogen monitor, and also a purge duct 22 via a purge valve 21.

For regeneration of the catalyst plant, the dampers 4, 5 are again closed, and the valves 6, 11 and 21 are first opened and a substantially oxygen-free carrier gas, e.g., steam, is introduced as cleaning gas and purges the catalyst plant, until the oxygen monitor connected to the supply pipe 13 establishes a sufficiently low oxygen content. The expelled flue gas then escapes via the drain pipe 12 and also the drain pipe 23 and the purge duct 22. The purge valve 21 is then closed and the outlet valve 24 is opened. Further carrier gas is conducted into the catalyst plant via the supply pipe 7, molecular hydrogen being added through the supply pipe 9, supplementing the carrier gas to give regenerating gas.

A substantially closed circuit flow is again developed from the supply pipe 7 through the SCONOx catalyst 3 and the drain pipe 23 via the pump 14 and back to the supply pipe 7, and also a linear flow from the supply pipe 7 through the SCOSOx catalyst 2 to the drain pipe 12, by means of which regenerating gas which has taken up SO2 in the SCOSOx catalyst 2 is extracted and removed. The removed regenerating gas is replaced by fresh.

Since the circuit flow is conducted through the SCONOx catalyst 3, the variant embodiment of the process is suitable from the standpoint of a considerable savings of regenerating gas, above all when the regeneration requirement of the latter is considerably greater than that of the SCOSOx catalyst 2, so that, e.g., between 80% and 90% of the total volume flow through the catalyst plant passes through the SCONOx catalyst 3.

Other than steam, both embodiments of the process according to the invention can also use as the carrier gas, molecular nitrogen, oxygen-poor flue gas of a gas burner, or else exhaust gas of an internal combustion engine operated with natural gas, gasoline, propane, or the like, preferably a piston engine, the power of which is used in the same manner as that of the gas turbine, and thus as a rule for electric power generation.

What is claimed is:

1. Apparatus for regeneration of a catalyst plant comprising:
   a catalyst for the removal of SO2, and arranged downstream thereof, a catalyst for the removal of NOx, from the flue gas of a gas turbine, and also at least one supply pipe for the introduction of regenerating gas, and at least one drain pipe for the extraction of regenerating gas, wherein the supply pipe opens between the catalyst for the removal of SO2 and the catalyst for the removal of NOx, and is connected to the drain pipe which leaves upstream of the catalyst for the removal of SO2, and a further supply pipe for the supply of fresh regenerating gas is present and opens downstream of the catalyst for the removal of NOx.

2. Apparatus according to claim 1, wherein at least one supply pipe for the addition of molecular hydrogen or hydrocarbon opens into at least one of the supply pipe for the introduction of regenerating gas and the further supply pipe for the supply of fresh regenerating gas.

3. Apparatus according to claim 2, wherein:
a steam reforming catalyst is situated between an opening of the at least one supply pipe for the addition of molecular hydrogen or hydrocarbon that opens into the supply pipe for the introduction of regenerating gas, and an opening of the supply pipe for the introduction of regenerating gas that opens between the catalyst for the removal of SO2 and the catalyst for the removal of NOx; and/or
a steam reforming catalyst is situated between an opening of the at least one supply pipe for the addition of molecular hydrogen or hydrocarbon that opens into the further supply pipe for the supply of fresh regenerating gas, and an opening of the further supply pipe for the supply of fresh regenerating gas that opens downstream of the catalyst for the removal of NOx.

4. Apparatus according to claim 1, wherein a purge duct for the supply or removal of a cleaning gas opens into at least one supply pipe or drain pipe.

5. Apparatus according to claim 1, wherein at least one drain pipe is connected to a hydrogen monitor and to an oxygen monitor.

6. Apparatus according to claim 1, further comprising a purge duct for the supply or removal of a cleaning gas, the purge duct opening into the drain pipe.

7. Apparatus according to claim 1, wherein the at least one drain pipe is connected to a hydrogen monitor and to an oxygen monitor.

8. Apparatus for regeneration of a catalyst plant comprising:
a catalyst plant with a catalyst for the removal of SO2, and arranged downstream thereof, catalyst for the removal of NOx, from the flue gas of a gas turbine, and also at least one supply pipe for the introduction of regenerating gas, and at least one drain pipe for the extraction of regenerating gas, wherein the supply pipe opens upstream of the catalyst for the removal of SO2 and is connected to the drain pipe which leaves between the catalyst for the removal of SO2 and the catalyst for the removal of NOx, and a further supply pipe for the supply of fresh regenerating gas is present and opens downstream of the catalyst for the removal of NOx.

9. Apparatus according to claim 8, wherein at least one supply pipe for the addition of molecular hydrogen or hydrocarbon opens into at least one of the supply pipe for the introduction of regenerating gas and the further supply pipe for the supply of fresh regenerating gas.

10. Apparatus according to claim 9, wherein:
a steam reforming catalyst is situated between an opening of the at least one supply pipe for the addition of molecular hydrogen or hydrocarbon that opens into the supply pipe for the introduction of regenerating gas, and an opening of the supply pipe for the introduction of regenerating gas that opens upstream of the catalyst for the removal of SO2; and/or
a steam reforming catalyst is situated between an opening of the at least one supply pipe for the addition of molecular hydrogen or hydrocarbon that opens into the further supply pipe for the supply of fresh regenerating gas, and an opening of the further supply pipe for the supply of fresh regenerating gas that opens downstream of the catalyst for the removal of NOx.

11. Apparatus according to claim 8, wherein a purge duct for the supply or removal of a cleaning gas opens into at least one supply pipe or drain pipe.

12. Apparatus according to claim 8, wherein at least one drain pipe is connected to a hydrogen monitor and to an oxygen monitor.

13. Apparatus according to claim 8, further comprising a purge duct for the supply or removal of a cleaning gas, the purge duct opening into the drain pipe.

14. Apparatus according to claim 8, wherein the at least one drain pipe is connected to a hydrogen monitor and to an oxygen monitor.

15. Apparatus for regeneration of a catalyst plant comprising:
a catalyst plant with a catalyst for the removal of SO2, and arranged downstream thereof, a catalyst for the removal of NOx, from the flue gas of a gas turbine, and also with at least one supply pipe for the introduction of regenerating gas, and at least one drain pipe for the extraction of regenerating gas, leaving upstream of the catalyst for the removal of SO2 wherein the supply pipe opens between the catalyst for the removal of SO2 and the catalyst for the removal of NOx, and is connected to a further drain pipe arranged downstream of the catalyst for the removal of NOx.

16. Apparatus according to claim 15, wherein a supply pipe for the addition of molecular hydrogen or hydrocarbon opens into at least one supply pipe.

17. Apparatus according to claim 16, wherein a steam reforming catalyst is situated between an opening of the at least one supply pipe for the addition of molecular hydrogen or hydrocarbon that opens into the supply pipe for the introduction of regenerating gas, and an opening of the supply pipe for the introduction of regenerating gas that opens between the catalyst for the removal of SO2 and the catalyst for the removal of NOx.

18. Apparatus according to claim 15, wherein a purge duct for the supply or removal of a cleaning gas opens into at least one supply pipe or drain pipe.

19. Apparatus according to claim 15, wherein at least one drain pipe is connected to a hydrogen monitor and to an oxygen monitor.

20. Apparatus according to claim 15, further comprising a purge duct for the supply or removal of a cleaning gas, the purge duct opening into the drain pipe.

21. Apparatus according to claim 15, wherein the further drain pipe is connected to a hydrogen monitor and to an oxygen monitor.

22. An apparatus for regenerating catalyst in a catalyst plant, the apparatus comprising:
a catalyst plant comprising a catalyst for the removal of SO2 and at least one catalyst for the removal of NOx, the catalyst for the removal of SO2 upstream of the at least one catalyst for the removal of NOx,
a first supply pipe in fluid communication with the catalyst plant at a first introduction point downstream of the at least one catalyst for the removal of NOx to introduce a regeneration gas into the catalyst plant;

at least one drain pipe in fluid communication with the catalyst plant at a first extraction point upstream of the catalyst for the removal of SO2 or between the catalyst for the removal of SO 2 and the at least one catalyst for the removal of NOx; and a second supply pipe in fluid communication with the catalyst plant at a second introduction point separated from the at least one drain pipe by the catalyst for the removal of SO2.

* * * * *